US006963691B2

(12) United States Patent
Yamamoto

(10) Patent No.: US 6,963,691 B2
(45) Date of Patent: Nov. 8, 2005

(54) REPRODUCING APPARATUS

(75) Inventor: Yukinori Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1104 days.

(21) Appl. No.: 09/732,757

(22) Filed: Dec. 11, 2000

(65) Prior Publication Data
US 2001/0003552 A1 Jun. 14, 2001

(30) Foreign Application Priority Data
Dec. 14, 1999 (JP) .................................. 11-354560

(51) Int. Cl.[7] ............................................ H04N 5/911
(52) U.S. Cl. ...................... 386/113; 386/125; 386/126; 369/53.18; 369/47.33; 360/60; 360/75
(58) Field of Search ................... 386/46, 95, 125–126, 386/113; 369/53.18, 47.33, 30.04, 30.09; 360/75, 60

(56) References Cited

U.S. PATENT DOCUMENTS

| | | | | | |
|---|---|---|---|---|---|
| 5,126,895 | A | * | 6/1992 | Yasuda et al. ........... | 369/44.33 |
| 5,553,041 | A | * | 9/1996 | Inagawa et al. .......... | 369/47.33 |
| 5,586,093 | A | * | 12/1996 | Honda et al. ............. | 369/53.21 |
| 5,613,112 | A | * | 3/1997 | Nagashima .............. | 369/30.04 |
| 5,724,323 | A | * | 3/1998 | Mamiya et al. .......... | 369/30.09 |
| 5,943,307 | A | * | 8/1999 | Takagi et al. ............ | 369/47.33 |
| 5,995,462 | A | * | 11/1999 | Harold-Barry ........... | 369/53.18 |

* cited by examiner

Primary Examiner—Vincent Boccio
(74) Attorney, Agent, or Firm—Fitzpatrick, Cella, Harper & Scinto

(57) ABSTRACT

The invention provides an apparatus for reproducing a plurality of image data which has been recorded in a plurality of independent areas on a disk-shaped recording medium and specified so as to be reproduced in predetermined order, from the disk-shaped recording medium by using a pickup mechanism. The apparatus has a memory for storing the reproduced image data and a memory control unit for reading out the image data stored in the memory in the predetermined order, and controls whether the image data recorded in the plurality of areas is reproduced in order different from the predetermined order and written in the memory or not, on the basis of position information indicative of positions of the plurality of areas on the disk-shaped recording medium, a capacity of the memory, and a seeking time between the plurality of areas by the pickup mechanism.

14 Claims, 6 Drawing Sheets

| | START ADDRESS | END ADDRESS | POINTER |
|---|---|---|---|
| A | $S_A$ | $E_A$ | POINTER TO B |
| | | | |
| C | $S_C$ | $E_C$ | POINTER TO D |
| | | | |
| B | $S_B$ | $E_B$ | POINTER TO C |
| | | | |
| D | $S_D$ | $E_D$ | POINTER TO NEXT |
| | | | |

START TIME OF MEMORY READ-OUT OF EACH DATA (1") INDICATES WAITING TIME DUE TO LACK OF SPACE OF MEMORY $T_A$, $T_B$ AND $T_C$ DENOTE TIME AT WHICH MEMORY READ-OUT OF EACH DATA IS ALLOWED

DATA READ-OUT ORDER    B > A > C > D > E

```
<seq>
    <video src="video1.mpg" clip-end="npt=10s/>
    <video src="video2.mpg" clip-begin="npt=8s" clip-end="npt=9s/>
    <video src="video1.mpg" clip-begin="npt=20s" clip-end="npt=30s/>
    <video src="video3.mpg"/>
    <video src="video1.mpg" clip-begin="npt=40s" clip-end="npt=50s/>
</seq>
```

REPRODUCING APPARATUS

BACKGROUND OF THE INVENTION

1. Field of the Invention

The invention relates to an apparatus for reproducing image information from a recording medium such as an optical disc or the like.

2. Related Background Art

Hitherto, in case of reproducing information by a pickup from an optical disc on which digital information has been recorded, if a tracking of the pickup is deviated due to a vibration or the like caused from the outside, a continuous reproduction of the recorded information is impossible (in case of audio information, a sound skip occurs).

To prevent such a situation, the information on the disc is preliminarily read out and stored in a memory and, when a sound skip occurs, the information stored in the memory is read out for a period of time during which the pickup is recovered. Such a memory is called a shockproof memory and widely used in a portable music reproducing MD (mini disc) or the like. Since a cheap memory of a large capacity can be obtained owing to the progress of the recent semiconductor technique, most of the sound skip can be avoided.

To assure continuity of the reproduction, it is important to control in a manner such that an underrun state such that all of the information stored in the shockproof memory is read out is not caused for a period of time until the tracking is recovered and the information can be normally reproduced. For this purpose, a technique for reducing the tracking deviation itself or the like by raising a pickup recovering speed (improvement of seeking performance), raising a read-out speed from the disc (in case of an MD, it is set to a speed that is about 4 times as high as a data rate of audio data to be recorded), or improving tracking performance also becomes important.

When the shockproof memory is full, a blank readout of the disc, a stop of the rotation of the disc itself (it is effective for power saving), or the like is usually performed.

There is a random reproducing function as another application of the shockproof memory. It is a function for reproducing music pieces in the order designated by the user, and it is a function which cannot be realized in a medium such as a tape or the like. In a manner similar to the case of the sound skip, even in a range where an underrun is not caused in the shockproof memory, the music pieces can be successively continuously reproduced in free order of music pieces without a waiting time.

However, in the case where the information to be reproduced exists intermittently on the disc due to the repetition of the edition or the like, since the seeking operation is frequently performed, there is a problem such that an underrun of the memory occurs and the reproduction is interrupted or an electric power consumption becomes very large. Particularly, the increase in electric power consumption causes a serious problem because it exerts an influence on a duration time of a battery in case of a portable apparatus.

SUMMARY OF THE INVENTION

It is an object of the invention to solve the problems as mentioned above.

Another object of the invention is to prevent a dropout of reproduction information even in the case where information to be reproduced exists intermittently in a plurality of areas on a medium.

Still another object of the invention is to enable an electric power consumption to be reduced in the case where information to be reproduced exists intermittently in a plurality of areas on a medium.

To solve the above problems and accomplish the above objects, according to a preferred aspect of the invention, there is provided a reproducing apparatus comprising: reproducing means for reproducing from a recording medium a plurality of image data which has been recorded in a plurality of independent areas on the recording medium and specified so as to be reproduced in predetermined order; a memory for storing the image data reproduced by the reproducing means; memory control means for controlling a writing and a read-out of the image data into/from the memory; and mode setting means for switching on the basis of positions of the plurality of areas on the recording medium, a first mode in which the image data recorded in the plurality of areas is reproduced by the reproducing means in order different from the predetermined order and written in the memory and the image data reproduced from the plurality of areas is read out from the memory in the predetermined order by the memory control means and a second mode in which the image data recorded in the plurality of areas is reproduced in the predetermined order by the reproducing means and written in the memory and the image data reproduced from the plurality of areas is read out from the memory in the predetermined order by the memory control means.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described in detail hereinbelow with reference to the drawings.

Figure 1:
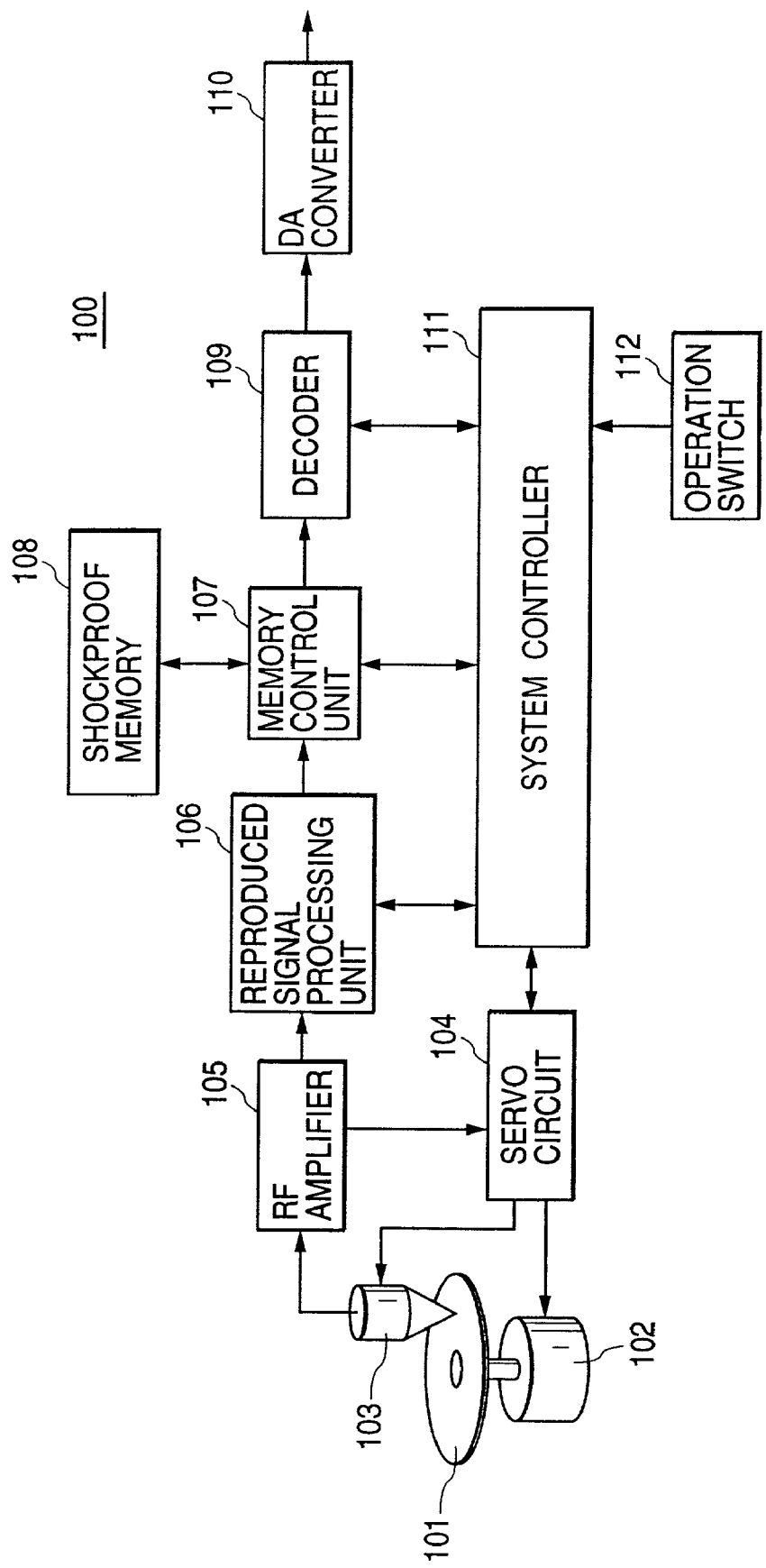
FIG. 1 is a block diagram showing a construction of a reproducing apparatus to which the invention is applied.

FIG. 1 is a block diagram showing a construction of a reproducing apparatus 100 to which the invention is applied.

In the diagram, reference numeral 101 denotes an optical disc as a recording medium; 102 a spindle motor for rotating the optical disc 101; 103 an optical pickup for reading recorded information on the optical disc 101; 105 an RF amplifier for amplifying a reproduced RF signal read out by the optical pickup 103; and 106 a reproduced signal processing unit for detecting an original digital signal from an output signal of the RF amplifier 105 and executing a signal processes such as error correction and the like. Reference numeral 107 denotes a memory control unit for controlling input/output of data to/from a shockproof memory 108; 109 a decoder for decoding a signal read out from the shockproof memory 108; 110 a DA converter; 111 a system controller for controlling each section of the apparatus; 112 an operation switch having various operation keys such as a reproducing key and the like; and 104 a servo circuit for performing a rotation control of the spindle motor 102 and a seeking control of the optical pickup 103. The servo circuit 104 also performs a focusing control and a tracking control of a laser beam of the optical pickup 103.

Encoded audio information, image information, or the like has been modulated and recorded on the optical disc 101 and it is read out by detecting reflection light from the disc 101 with the optical pickup 103 in a state where the disc is rotated by the spindle motor 102. In the embodiment, the audio data or image data has been encoded by the MPEG (Moving Picture Experts Group) 2 system and recorded.

The servo circuit 104 performs the focusing control and the tracking control by using a well-known method when the data is read out by the optical pickup 103. The servo circuit also performs the seeking control for positioning the optical pickup 103 to a target track by controlling a feed motor (not shown). In the present embodiment, the data is reproduced from the disc 101 by using a zone CAV (Constant Angular Velocity) system and a rotational speed of the disc 101 is changed every zone comprising a predetermined number of tracks.

The reproduced RF signal derived by the optical pickup 103 is amplified by the RF amplifier 105, demodulated and error corrected by the reproduced signal processing unit 106, and written into the shockproof memory 108 through the memory control unit 107.

The signal read out of the shockproof memory 108 is decoded by the decoder 109 and outputted via the DA converter 110. If a read-out speed (writing speed into the shockproof memory) of the signal from the optical disc 101 is higher than an outputting speed (read-out speed from the shockproof memory), even if the optical pickup 103 cannot reproduce the signal for a little while due to a vibration or the like from the outside, by controlling a capacity of the shockproof memory 108, it is possible to prevent a situation such that the output signal is interrupted.

The system controller 111 always grasps a storing state of the data in the memory 108 by a control signal from the memory control unit 107. All of those controls are performed by the memory control unit 107 on the basis of the control of the system controller 111. For example, if a data rate of the recorded data is equal to 5 Mbps and the capacity of the memory 108 is equal to 64 MB, the reproduced data as much as about 100 seconds can be stored in the memory 108.

The memory control unit 107 has: an address management unit for determining a write address in the memory 108 on the basis of an ID of the reproduced data and determining a read address in accordance with a control signal from the system controller 111; a memory interface for writing the reproduced data into the memory 108 in accordance with the write address and reading out the data from the memory 108; or the like.

The memory control unit 107 reads out the audio/image data from the memory 108 at a proper timing by the control of the system controller 111 and outputs it to the decoder 109. The decoder 109 decodes the data read out from the memory 108 and outputs it to equipment such as an external monitor or the like outside of the apparatus through the DA converter 110.

Figures 2, 3:
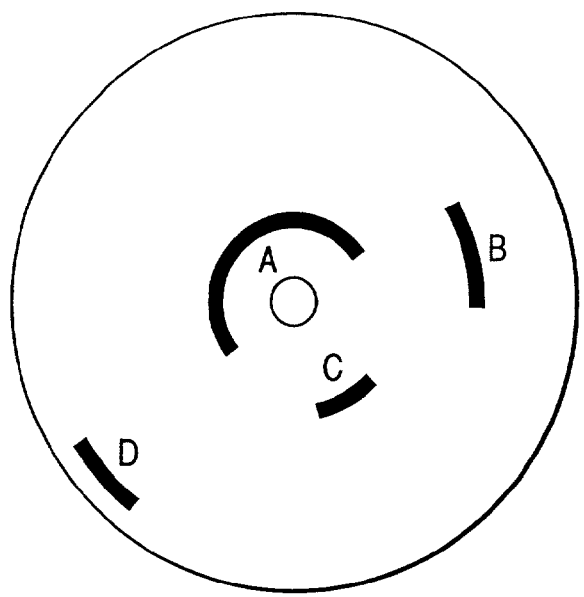
FIG. 2 is a diagram showing a state of data recorded on a disc in FIG. 1.
FIG. 3 is a diagram showing a state of TOC regarding the recorded data on the disc in FIG. 2.

It is now assumed that the signals to be reproduced exist intermittently at positions on the optical disc 101 as shown in FIG. 2. Reference characters A, B, C, and D are added to respective areas in the diagram. It is assumed that the signals are reproduced in order of A to D.

FIG. 3 shows a part of a disc management information table called TOC (Table Of Contents). The TOC is recorded at a predetermined position on the disc 101, specifically speaking, on a predetermined number of tracks on the innermost track side of the disc 101 in the embodiment. When the disc 101 is newly inserted, the reproducing apparatus 100 first reproduces the TOC data from the disc 101. The reproduced TOC data is detected by the reproduced signal processing unit 106 and outputted to the system controller 111. The system controller 111 stores the TOC data into a built-in memory (not shown) and, subsequently, controls an access to the disc 101 on the basis of the TOC data.

The above table has a list structure and is mainly constructed by: information showing a range from which position (track, sector) to which position on the disc where a recording area of each data uses; and a pointer to the next recording area. For example, the recording data to the area A is recorded in addresses SA to EA and has a pointer to the area B. By sequentially tracing this list, the data recorded in the areas A to D in FIG. 2 can be reproduced.

The seeking operation in case of reproducing the data in the areas A to D will now be described with reference to FIGS. 4A and 4B.

Figure 4A:
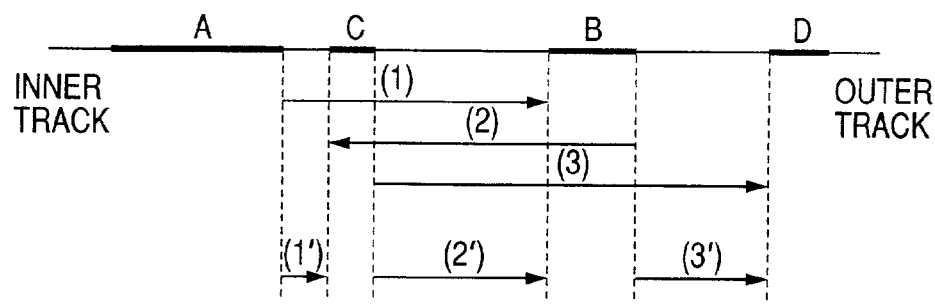
FIGS. 4A and 4B are diagrams showing a reproducing procedure of the disc in FIG. 2.

FIG. 4A one-dimensionally shows a state from the inner track to the outer track on the disc. The left side shows the inner track position on the disc and the right side shows the outer track position. When it is reproduced in accordance with the list of FIG. 3, the data is reproduced from the area A and, thereafter, the seeking operation shown by (1) in the diagram is performed, the data in the area B is reproduced and, further, the seeking operation of (2), the reproduction of (3), the seeking operation of (3), and the reproduction of D are executed. It will be understood that the seeking operation of a very long distance is frequently performed.

As mentioned above, since the sound skip is prevented by reading out the information stored in the shockproof memory 108 during the seeking operation, in the case where it takes long time for the seeking operation, a danger such that an underrun of the memory occurs and the reproduction is interrupted is large.

A time which is required for the series of seeking operations will now be considered. The seeking operation is dissolved into: the moving operation to move the optical pickup 103 to a predetermined radial position; the operation to lock a rotational speed of the spindle motor 102; the tracking operation; and the operation to actually read the information and find a target sector address.

Among those operations, particularly, since a powerful motor cannot be used because of a limitation such as power saving or miniaturization in portable equipment, the longest time is needed for the moving operation of the optical pickup 103 and time of a few seconds is necessary. Time on the order of milliseconds is required for the other operations. That is, most of the time which is required until the information is actually read out through the series of seeking operation is spent for the time that is necessary for movement of the optical pickup 103.

Therefore, it can be considered that the seeking time is almost proportional to a movement distance of the optical pickup 103. Naturally, as the movement distance is longer, the electric power consumption of the motor increases more. Therefore, referring again to FIG. 4A, it will be understood that a vain time and a vain electric power are large in the seek of (1), (2), and (3).

In the embodiment, by preparing the shockproof memory 108 having a sufficient capacity and changing the inherent disc accessing order, the number of seeking times is reduced or the seeking distance is shortened. This process is shown by (1)', (2)', and (3)' in FIG. 4A. That is, in the system controller 111, since an amount of information to be reproduced from each recording area and a positional relation of each area on the disc 101 can be previously recognized on the basis of the information of the TOC, by reading out the information from the disc in such an order that the seeking operation can be performed most efficiently and controlling the read addresses from the memory 108 in consideration of the capacity of the memory 108, the operation for resetting the reproducing order to the inherent reproducing order is performed.

Figures 5A, 5B, 5C, 5D:
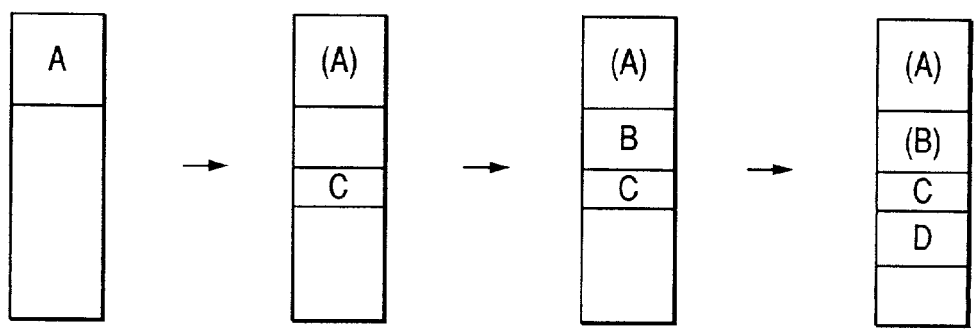
FIGS. 5A, 5B, 5C and 5D are diagrams showing a state of stored data in a shockproof memory in the apparatus in FIG. 1.

FIGS. 5A to 5D show a change in data which is stored in the shockproof memory 108 at the time of accessing to the disc 101 in order of (1)', (2)', and (3)' in FIG. 4A. First, the data is read out from the area A on the disc 101 and stored in the shockproof memory 108 as shown in FIG. 5A. Subsequently, by performing the seeking operation of (1)', the data in the area C is read out and stored in the shockproof memory 108 as shown in FIG. 5B. In this case, as shown in (A) in FIG. 5B, while the data is being read out from the area C, the memory area of (A) is in a state where the data is being read out as reproduced information from the memory 108. Therefore, after completion of the writing of the reproduced data in the area C into the memory 108, the memory area of (A) can be sequentially used from the head address in the memory area of (A). For example, by writing the information in the area D into the memory area of (A), the capacity of the memory 108 can be reduced.

After completion of the read-out of the data in the area C, the seeking operation of (2)' is performed and the data in the area B is read out and stored in the memory 108 as shown in FIG. 5C. When the area B is very large, the memory 108 lacks the capacity. In this case, however, it is sufficient to access in the conventional order of A, B, and C. That is, it is because since time which is necessary for reproducing the area B is long enough, the seeking operation does not occur for a little while and one seeking operation from the area A to the area B is considered to be sufficiently efficiently performed.

After completion of the read-out of the area B, the seeking operation of (3)' is performed and the data in the area D is read out and stored in the memory 108 as shown in FIG. 5D. In this case, as shown as (B) in FIG. 5D, while the data is being read out from the area D, the data is read out as reproduced information from the memory area of (B). After the data was read out from the memory area of (B), the data is read out from the memory 108 in order of C and D. In this way, the information in the memory 108 is read out in inherent order of A, B, C, and D.

An algorithm for a process which is executed in the system controller 111 in order to determine the accessing order for reading out the information from the optical disc 101 will now be described with reference to FIGS. 6A to 6C.

Figure 6A:
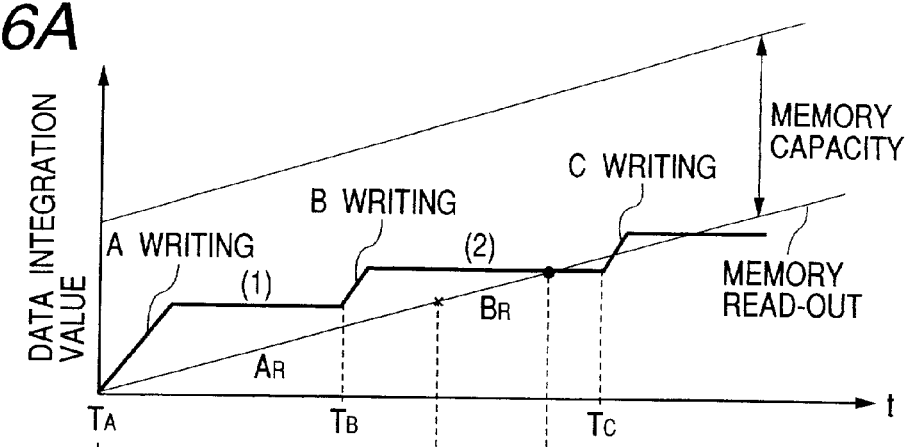
FIGS. 6A, 6B and 6C are diagrams showing a state of the reproducing operation according to the apparatus in FIG. 1.

FIG. 6A shows writing/read-out timings of the memory 108 in case of accessing in order of (1), (2), and (3) in FIG. 4A. FIG. 6B shows writing/read-out timings of the memory 108 in case of accessing in order of (1)', (2)', and (3)' in FIG. 4A. FIG. 6C shows timings in the case where an overflow of the memory occurs. A, B, C, (1), (2), (3), (1)', (2)', and (3)' in FIGS. 6A to 6C correspond to those shown in FIGS. 4A and 4B, respectively.

Figure 6B:
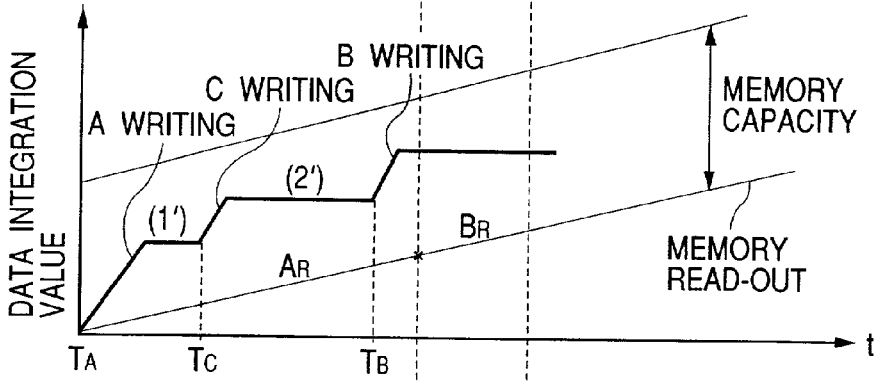
Figure 6C:
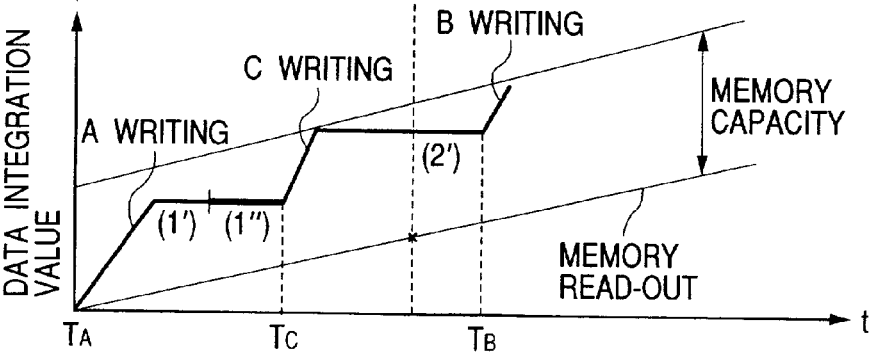

Since the read-out from the memory 108 is always performed, the read-out from the memory 108 is shown by a straight line in FIGS. 6A to 6C. Further, the writing speed into the memory 108 is higher than the read-out speed (for example, it is assumed that the read-out speed from the memory 108 is set to 5 Mbps and the writing speed, namely, the read-out speed of the data from the disc 101 is set to 20 Mbps). The reproduction of the data from the disc 101 and the writing of the reproduced data into the memory 108 are intermittently performed through the seeking operation.

TA, TB, and TC denote times at which the data in the areas A, B, and C can be read out from the memory 108. TA', TB', and TC' denote times to actually start the operation for reading out the data from the memory 108. To read out the data from the memory 108 without interruption, it is necessary that TA, TB, and TC exist before TA', TB', and TC'.

In the case where the access is performed in order of (1), (2), and (3) in FIG. 4A, as shown in FIG. 6A, an underrun occurs because the seeking time of (2) is too long. On the other hand, in the embodiment, as shown in FIG. 6B, since the area C is first read out, although there is no problem with respect to the information in the area C, TB is later than that in case of FIG. 6A.

However, if TB is located before TB', the data can be read out from the memory 108 without interruption. Therefore, the system controller 111 calculates the writing time of the data in the area A into the memory 108, the seeking time of (1)', the writing time of the data in the area C into the memory 108, and the seeking time of (2)'. The time TB based on the total time of them is compared with the start time TB' for reading out the data in the area B from the memory 108, thereby discriminating whether TB≦TB' is satisfied or not.

If this condition is satisfied, since no underflow of the memory occurs, the read-out order which has inherently been determined to be A, B, C, . . . is changed to the order of A, C, B, . . . . The data in each area is read out and written into the memory 108 as mentioned above. The system controller 111 controls the memory control unit 107 so as to read out the data from the memory 108 as shown in FIG. 5. Since the position and size of the data in each area exist in the TOC, the writing time into the memory 108 and the seeking time are calculated on the basis of them.

FIG. 6C shows an example in the case where the access is performed in order of (1)', (2)', and (3)' and an overflow of the memory 108 occurs, so that TB is located after TB'.

Since the capacity of the memory 108 is small or the data in the area C is large, the apparatus waits until the memory area in the memory 108 becomes empty at (1)" after completion of the seeking operation of (1)'. TB is delayed by such a waiting time and an underrun of the readout operation of the memory occurs. With respect to the overflow of the memory 108, therefore, if the calculations are executed also in consideration of the waiting time (1)", there is no need to consider the overflow. Since an underrun occurs at TC even in case of using the method of FIG. 6A, in case of FIG. 6C, an electric power consumption can be reduced by an amount corresponding to the short seeking distance.

On the other hand, although TB is later than TB' since the data in the area B is large in FIG. 6A, in the case where it is determined that no underrun at TB occurs as in the case where, for example, the data in the area C is larger than that in case of FIGS. 6A to 6C and the data in the area B is smaller than that in case of FIGS. 6A to 6C or the like, the system controller 111 sequentially accesses in order of (1), (2), and (3) and reproduces the data as shown in FIG. 6A. By accessing in this manner, the data can be read out from the memory 108 without interruption.

As mentioned above, in the embodiment, in the case where it is determined that the underrun of the memory 108 occurs when the accessing order is set to (the area A→area C→area B) and that no underrun occurs when the accessing order is set to the inherent reproducing order of (the area A→area B→area C), the system controller 111 gives a priority to continuity of the reproduced data (continuity of the read-out data from the memory 108) and executes the access in the latter order. If it is determined that the underrun of the memory 108 occurs in both of the above cases as shown in FIGS. 6A and 6C, the system controller 111 accesses as shown in FIG. 6C, thereby saving an electric power consumption.

If it is decided that the underrun occurs in both of them as shown in FIGS. 6A and 6C, it is also possible to compare a difference between TC' and TC in FIG. 6A with a difference between TB' and TB in FIG. 6C and perform the access by the method corresponding to the smaller difference, namely, by the method in which the waiting time of the read-out from the memory 108 is shorter.

Figure 4B:

FIG. 4B shows an example in which the effect of the embodiment is further clear. Unlike the case of FIG. 4A, all of the areas are neighboring. In case of FIG. 4A, although there is no change in the number of seeking times itself, in this case, as will be obviously understood from FIG. 4B, since it is sufficient to sequentially read out the areas A, C, B, and D, there is no need to perform the seeking operation.

Another embodiment of the invention will now be described. Also in this embodiment, a construction of the reproducing apparatus 100 to which the invention is applied is similar to that in the foregoing embodiment.

In this embodiment, a series of motion images and a scene of audio data have been recorded as one file on the disc 101. By using the random access performance of the disc and the shockproof memory, not only each file is reproduced in recording order in accordance with the TOC as mentioned above but also desired motion image files or still image files can be continuously reproduced in desired order.

Not only the reproducing order of the files but also a partial scene (clip) in the file can be designated. What is called a seamless reproduction similar to the case where an edition is performed can be realized. In this embodiment, it is also possible to construct the apparatus in such a manner that program information for reproducing desired data in desired order as mentioned above is formed by an editing apparatus or a recording apparatus (not shown) and recorded on the disc 101 and the data of each file is reproduced in accordance with the program information.

Figures 7, 8:
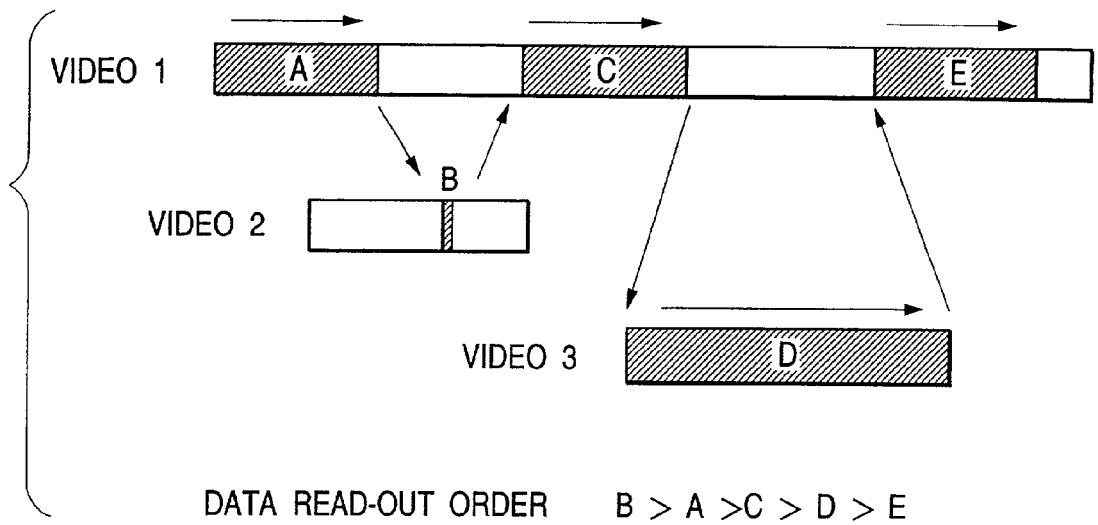
FIG. 7 is a diagram showing a state of a reproducing procedure of a disc according to another embodiment of the invention.
FIG. 8 is a diagram showing play list data recorded on the disc in FIG. 7.

Those program information can be described as a kind of program by a text style and if it is preserved as a file, the same edition result can be reproduced any times. Such a process is called a play list or scene description and an example of it is shown in FIG. 8. As a description language, SMIL (Synchronized Multimedia Integration Language) is used. In the description of each line, a name of the motion image file and clip start point and end point in the file are designated. The edition by the play list largely differs from the conventional edition with respect to a point that an edition result is not formed as a new file and the disc capacity and time which is necessary for writing can be also saved.

Figure 9:
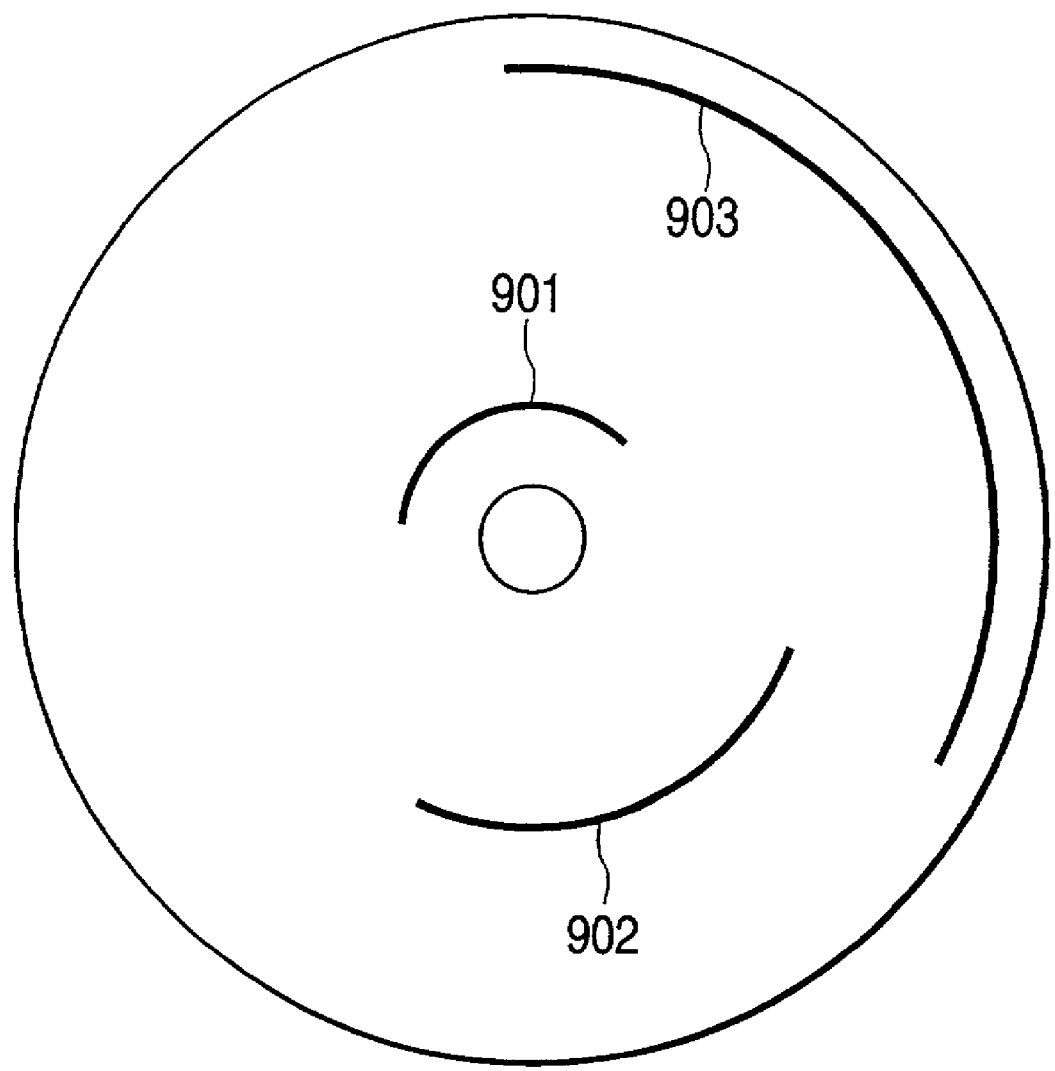
FIG. 9 is a diagram showing a state of recorded data on the disc in another embodiment of the invention.

FIG. 7 is an explanatory diagram for reproducing three motion image files (video 1 to video 3) in accordance with the play list of FIG. 8. As shown in FIG. 9, the motion image files are recorded at remote positions on the disc 101. The file of video 1 is recorded in an area 901 in FIG. 9. The file of video 2 is recorded in an area 902 in FIG. 9. The file of video 3 is recorded in an area 903. As shown in the diagram, the files are recorded in order of the area 902, area 903, and area 901 from the inner track on the disc 101. The seeking operation is necessary to continuously reproduce the data over the files. According to the play list of FIG. 8, the data is reproduced in order of the areas A, B, C, D, and E in FIG. 7. Particularly, since the area B is small, there is a possibility such that the shockproof memory 108 causes an underrun due to the seeking operation from A to B in FIG. 7 as mentioned above.

To prevent such a situation, by changing the inherent accessing order, accessing the area B precedingly to the area A, and reading the data into the memory, the seeking time from A to B and the seeking time from B to C can be omitted. Since the data amount in the area B is also small, a memory of a large capacity is unnecessary. With respect to the area D, since the data amount is large and a possibility of underrun is small, the accessing order is not changed.

Thus, in this example, the accessing order is set to the order of B, A, C, D, and E. As mentioned above, by changing the accessing order, even at the time of the play list execution, the interruption of the reproduced image (or still image state) which is caused by the memory underrun due to the waiting for the seeking operation can be avoided.

Specific processes by the apparatus of FIG. 1 will now be described.

In the embodiment, when the reproduction of the play list is instructed by the operation switch 112, the system controller 111 controls the servo circuit 104 and reproduces the play list data shown in FIG. 8 recorded in a predetermined area on the disc 101, namely, in the recording area next to the TOC area in the embodiment.

As mentioned above, the play list data reproduced by the pickup 103 is processed by the RF amplifier 105 and reproduced signal processing unit 106 and outputted to the system controller 111. The system controller 111 stores the reproduced play list data into a built-in memory (not shown).

The system controller 111 determines the read-out order of the data from the disc 101 (accessing order to the disc 101) on the basis of the reproducing procedure of the reproduced play list and the recording position of each file on the disc 101 shown in the TOC data.

In the example shown in FIGS. 7 and 9, the movement amount of the pickup 103 in case of accessing in order of B→D→A→C→E can be set to the smallest value. The system controller 111 discriminates whether the memory 108 causes an underrun in the case where the data is reproduced in such an order or not. In the embodiment, as a result of consideration of the seeking time of the pickup to each area and the capacity of the memory 108, it is assumed that it is determined that an underrun occurs in case of reading out the data of D after the data of B was read out, and the data is read out in order of B→A→C→D→E.

As mentioned above, in the embodiment, even at the time of reproduction according to the play list, on the basis of the recording area of each data and the reproducing procedure disclosed in the play list, the data read-out order is changed so as to reduce the seeking distance of the pickup without causing the underrun of the memory. Therefore, the data can be reproduced without a dropout of the data and the electric power consumption in this instance can be also saved.

Although the embodiments have been described with respect to the apparatus for reproducing the data from the optical disc of the zone CAV system, the invention can be also applied to an apparatus for reproducing data from another disc medium such as optical disc, hard disc, or the like of the other system.

Many widely different embodiments of the present invention may be constructed without departing from the spirit and scope of the present invention. It should be understood that the present invention is not limited to the specific embodiments described in the specification, except as defined in the appended claims.

What is claimed is:

1. A reproducing apparatus comprising:
reproducing means for reproducing from a recording medium a plurality of image data which has been recorded in a plurality of independent areas on the recording medium and specified so as to be reproduced in predetermined order, said reproducing means having a pickup mechanism for seeking said independent areas on said recording medium prior to said reproducing of image data;
a memory for storing the image data reproduced by said reproducing means;
memory control means for controlling a writing and a read-out of said image data into/from said memory; and
mode setting means for switching between first and second modes on the basis of positions of said plurality of areas on said recording medium and on a basis of a time for said seeking between said areas by said pickup mechanism, wherein in said first mode the image data recorded in said plurality of areas is reproduced by said reproducing means in an order different from said predetermined order and written in said memory and the image data reproduced from said plurality of areas is read out from said memory in said predetermined order by said memory control means, and in said second mode the image data recorded in said plurality of areas is reproduced in said predetermined order by said reproducing means and written in said memory and the image data reproduced from said plurality of areas is read out from said memory in said predetermined order by said memory control means.

2. An apparatus according to claim 1, wherein said reproducing means reproduces TOC data indicative of the positions of said plurality of areas on said recording medium from said recording medium, and said mode setting means switches said first and second modes on the basis of said TOC data reproduced by said reproducing means.

3. An apparatus according to claim 2, wherein said predetermined order is specified in accordance with said TOC data.

4. An apparatus according to claim 1, wherein said mode setting means further switches said first and second modes on the basis of an amount of image data which can be stored in said memory.

5. An apparatus according to claim 1, wherein said mode setting means discriminates whether the image data can be continuously read out from said memory in said predetermined order in the case where said image data is reproduced in said first mode, and switches between said first and second modes on the basis of a result of said discrimination.

6. An apparatus according to claim 1, wherein said mode setting means further switches said first and second modes on the basis of program data indicative of a reproducing procedure of said image data from said plurality of areas and the positions of said plurality of areas.

7. An apparatus according to claim 6, wherein said predetermined order is specified in accordance with said program data.

8. An apparatus according to claim 6, wherein said reproducing means reproduces said program data from said recording medium.

9. An apparatus according to claim 1, wherein said memory is also used as a shockproof memory.

10. An apparatus according to claim 1, wherein said image data has been encoded by an MPEG system and said memory stores said encoded image data.

11. An apparatus according to claim 1, wherein said recording medium includes a disc medium.

12. An apparatus according to claim 1, wherein said recording medium includes an optical disc medium of a zone CAV system.

13. A reproducing apparatus comprising:
reproducing means for reproducing a plurality of image data which has been recorded in a plurality of independent areas on a disk-shaped recording medium and specified so as to be reproduced in predetermined order, from said disk-shaped recording medium by using a pickup mechanism;
a memory for storing the image data reproduced by said reproducing means;
memory control means for reading out the image data stored in said memory in said predetermined order; and
control means for controlling whether the image data recorded in said plurality of areas is reproduced in order different from said predetermined order and written in said memory or not, on the basis of position information indicative of positions of said plurality of areas on said disk-shaped recording medium, a capacity of said memory, and a seeking time between said plurality of areas by said pickup mechanism.

14. An apparatus according to claim 13, wherein said predetermined order is specified in accordance with a play list indicative of a reproducing procedure for reproducing the image data in a desired order.

* * * * *